United States Patent [19]
Suzuki

[11] Patent Number: 5,346,780
[45] Date of Patent: Sep. 13, 1994

[54] FUEL CELL AND METHOD FOR PRODUCING AN ELECTRODE USED THEREFOR

[75] Inventor: Nobukazu Suzuki, Tokyo, Japan
[73] Assignee: Kabushiki Kaisha Toshiba, Kanagawa, Japan
[21] Appl. No.: 978,262
[22] Filed: Nov. 20, 1992

[30] Foreign Application Priority Data

Nov. 25, 1991 [JP] Japan ............... 3-309133

[51] Int. Cl.$^5$ ............ H01M 8/02; H01M 4/90
[52] U.S. Cl. ........................ 429/42; 429/32; 429/33
[58] Field of Search ............ 429/33, 30, 42, 31, 429/32

[56] References Cited

U.S. PATENT DOCUMENTS

| | | |
|---|---|---|
| 4,610,938 | 9/1986 | Appleby ............... 429/42 |
| 5,242,764 | 9/1993 | Dhar ................... 429/30 |

FOREIGN PATENT DOCUMENTS

| | | |
|---|---|---|
| 62-163746(A) | 7/1987 | Japan. |
| 2-82456 (A) | 3/1990 | Japan. |
| 3184266 | 8/1991 | Japan. |

OTHER PUBLICATIONS

Chem. Abs.; CA115(22):236351; Suzuki, 1991.
Japanese Abs.; 008773903, 03521366; Suzuki, 1991.
Encyclopedia of Polymer Science and Engineering; vols. 6 & 10; pp. 808 & 678, respectively; 1986-87.

*Primary Examiner*—Johann Richter
*Assistant Examiner*—Michael B. Hydorn
*Attorney, Agent, or Firm*—Finnegan, Henderson, Farabow, Garrett & Dunner

[57] ABSTRACT

In a fuel cell comprising a pair of gas-diffusion electrodes provided with a porous catalyst layer and an acidic electrolyte layer held by the pair of gas-diffusion electrodes, a cathode which constitutes itself one of the pair of gas-diffusion electrodes comprises a heat-resistant and acid-resistant carrier particles and a noble metal catalysts carried on the carrier particles, the surface of the carrier particles and the catalysts being coated with a proton-conductive thin film exhibiting the ability to dissolve and diffuse oxygen and offering resistance to heat and acids or at least the surface of the noble metal catalysts being coated with a thin film which is a polymer network retaining a proton-conductive substance capable of dissolving and diffusing oxygen and resisting heat and acids therein. The proton-conductive thin film of the cathode or the thin film of the polymer network containing the proton-conductive substance is produced by placing an electrode substrate in an electrolytic solution containing a proton-conductive substance alone or in combination with a polymer network material and submitting it to electrolysis therein.

9 Claims, 5 Drawing Sheets

FUEL CELL AND METHOD FOR PRODUCING AN ELECTRODE USED THEREFOR

BACKGROUND OF THE INVENTION

1. Field of the Invention

This invention relates to improvements in a fuel cell. More particularly, this invention concerns a fuel cell using an acidic electrolyte such as a phosphoric acid fuel cell or a polymer electrolyte fuel cell which uses an electrode catalyst in the cathode thereof and a method for producing electrodes for use in the fuel cell.

2. Description of the Related Art

In recent years, the fuel cell has been attracting growing attention as a highly efficient energy conversion device. The fuel cell generally is formed of a plurality of elementary cells comprising an electrolytic layer containing ion seeds which contribute to the electrode reaction and hold two electrodes severally of positive and negative polarity, which are capable of transferring electrons without being degraded by the electrode reaction and also capable of migrating reactants and holding the electrolytic layer therebetween. This fuel cell is completed by superposing such elementary cells through the medium of intervening current collector plates. Since the electrodes mentioned above are intended to afford a site for generating an electromotive reaction, they are generally formed of a porous substance and made to contain a catalyst which contributes to the electromotive reaction. Thus, they function as a catalytic electrode.

The fuel cells constructed as described above are classified by the kind of electrolyte into phosphoric acid fuel cells, polymer electrolyte fuel cells, molten carbonate fuel cells, etc. The fuel cells using an acidic electrolyte such as the phosphoric acid fuel cells and the polymer electrolyte fuel cells are each composed of a pair of opposed gas-diffusion electrodes, i.e. a cathode and an anode, and the layer of an electrolyte retaining electrolytic phosphoric acid or a proton-conductive solid polymer electrolyte that is held by the pair of electrodes mentioned above. As the matrix for supporting the gas-diffusion electrode mentioned above, a generally porous carbon electrode substrate having carbon as a main component thereof is used. The electrode substrate is so constructed as to have a catalytic layer such as of platinum carried on the surface thereof. The gas feed layers incorporated in the electrode matrix supply hydrogen gas to the anode and oxygen gas to the cathode.

When the hydrogen gas is fed to the anode and the oxygen gas to the cathode respectively as described above, the catalytic layer of the anode generates a reaction of the following formula:

$$H_2 \rightarrow 2H^+ + 2e^- \quad (1)$$

The electrons arising from this reaction perform work while flowing through an external circuit, then reach the cathode, and induce the catalytic layer of the cathode to generate a reaction of the following formula:

$$\tfrac{1}{2}O_2 + 2H^+ + 2e^- \rightarrow H_2O \quad (2)$$

and entail evolution of water. At this time, the $H^+$ ions occurring in the electrolyte migrate from the anode to the cathode.

The most profound problem to be encountered in contemplating the commercial operation of a power generating plant using such acidic electrolyte type fuel cells as described above resides in decreasing the cost. To be specific, since the price of the fuel cell stacks accounts for a large proportion of the cost of the power generating plant, the decrease in the cost of these fuel cell stacks is the gravest task of all. As one measure for the accomplishment of the cutting of the cost, the improvement of performance of fuel cells (increase in the output per unit surface area) can be cited besides the improvement on the technique of production. When the output is doubled, for example, the cost of the fuel cell stacks can be decreased roughly to $\tfrac{1}{2}$ and the total cost of the power generation plant can be significantly lowered.

For the purpose of enhancing the performance of an acidic electrolyte fuel cell, particularly a phosphoric acid fuel cell, the enhancement of performance of the electrodes, especially the improvement of the cathode, in the fuel cell is highly effective. To be more specific, the activating polarization of the oxygen-reducing reaction in the cathode is notably larger than the activating polarization of the hydrogen-oxidizing reaction in the anode. For the purpose of lowering the activating polarization of the oxygen-reducing reaction, measures for the improvement of the electrode catalyst in the cathode such as, for example, the adoption of an alloy catalyst (as disclosed in Japanese Unexamined Patent Publication No. 163,746/1987, for example) have been proposed to date. These measures, however, are not fully satisfactory.

With a view to cutting the cost of the acidic electrolyte type fuel cell, the desirability of lowering the activating polarization of the oxygen-reducing reaction in the cathode thereby improving the quality of the cathode and consequently promoting the enhancement of the performance of the fuel cell has been gaining increased recognition.

SUMMARY OF THE INVENTION

This invention has been produced with a view to coping with the problem mentioned above. An object of this invention is to provide an acidic electrolyte type fuel cell which, owing to a significant improvement attained in the quality of the cathode thereof, is endowed with enhanced fuel cell performance and enabled to enjoy a cut in cost.

Another object of this invention is to provide a method for the production at a significantly lowered cost of the aforementioned electrode for use in the fuel cell.

The fuel cell contemplated by this invention comprises a pair of gas-diffusion electrodes incorporating therein a porous catalytic layer and an acidic electrolyte layer held by the pair of gas-diffusion electrodes and it is characterized in that a cathode constituting one of the pair of gas-diffusion electrodes has a surface of heat-resistant acid-resistant carrier particles and a surface of noble metal catalysts carried on the carrier particles both coated with a proton-conductive thin film capable of dissolving and diffusing oxygen and resisting heat and acids.

The second fuel cell contemplated by the present invention comprises a pair of gas-diffusion electrodes incorporating therein a porous catalytic layer and an acidic electrolyte layer held by the pair of gas-diffusion electrodes and this fuel cell is characterized in that the cathode which constitutes one of the pair of gas-diffusion electrodes is composed of heat-resistant acid-resistant carrier particles and noble metal catalysts carried on the carrier particles and at least the noble metal catalysts have a surface coated with a thin film which is formed of a heat-resistant and acid-resistant polymer network retaining a proton-conductive substance capable of dissolving and diffusing oxygen.

Then, the method of this invention for producing the electrode comprises preparing a porous electrode substrate with carrier particles having a noble metal catalyst carried on the carrier particles, placing this electrode substrate as one of a pair of opposite electrodes in an electrolytic solution containing a proton-conductive substance, and subjecting it therein to electrolytic polymerization thereby forming a thin proton-conductive film on the electrode substrate. The second method for the production of the electrode contemplated by this invention is characterized by placing the same electrode substrate as mentioned above in an electrolytic solution containing a polymer network material and a proton-conductive substance, passing an electric current between the electrode mentioned above and a counter electrode thereby effecting electrolytic polymerization and having the surface of at least the noble metal catalyst coated with a thin film of the polymer network retaining the proton-conductive substance. In the method for the production of the electrode mentioned above, the electric current to be used for the electrolytic polymerization is in the form of a pulse.

In the fuel cell of this invention, the surface of an oxygen-reducing catalyst in the cathode (active sites for generating the oxygen-reducing reaction) and the surface of the carrier particles therefore are coated with a thin film exhibiting resistance to heat and acids, having ability to dissolve and diffuse molecular or ionic oxygen, and exhibiting conductivity to protons. The proton-conductive thin film capable of dissolving and diffusing oxygen, therefore, intervenes between the noble metal catalyst and the carrier particles therefor on one part and the acidic electrolyte or an oxidized gas on the other part. For this reason, near the surface of the catalysts, the concentrations of the reactants ($O_2$ and $H^+$) in the reaction of the formula (2) mentioned above are increased and the reaction itself is consequently promoted. As a result, the oxygen-reducing reaction in the cathode is promoted. Further, since the surface of the carrier particles is also isolated from the acidic electrolyte by the proton-conducting thin film, the carrier or the electrode substrate can be prevented from corrosion and the service life of the cell can be elongated.

Further in the second fuel cell contemplated by this invention, at least the surface of the oxygen-reducing catalysts (active sites for generating the oxygen-reducing reaction) in the cathode are coated with a polymer thin film exhibiting resistance to heat and acids, excelling in the ability to dissolve and diffuse molecular or ionic oxygen, and incorporating a proton-conductive substance in a polymer network. Thus, the polymer thin film incorporating therein a proton-conductive substance which exhibits the ability to dissolve and diffuse oxygen intervenes between the noble metal catalyst and the carrier particles therefor on one part and the acidic electrolyte or the oxidized gas on the other part. For this reason, near the surface of the catalyst, the concentrations of the reactants ($O_2$ and $H^+$) in the reaction of the formula (2) mentioned above are increased and the reaction itself is promoted. Further, the carrier particles coated with the polymer film can be prevented from corrosion and the service life of the cell can be extended.

In accordance with the method of this invention for producing the electrode, the produced electrode is used ideally in a fuel cell because the polymer thin film having a proton-conductive substance retained therein with a polymer network exhibits an ample binding force to the noble metal catalyst and the electrode substrate.

DESCRIPTION OF THE PREFERRED EMBODIMENTS

Now, the fuel cell of this invention will be described more specifically below with reference to working examples thereof.

Figure 1:
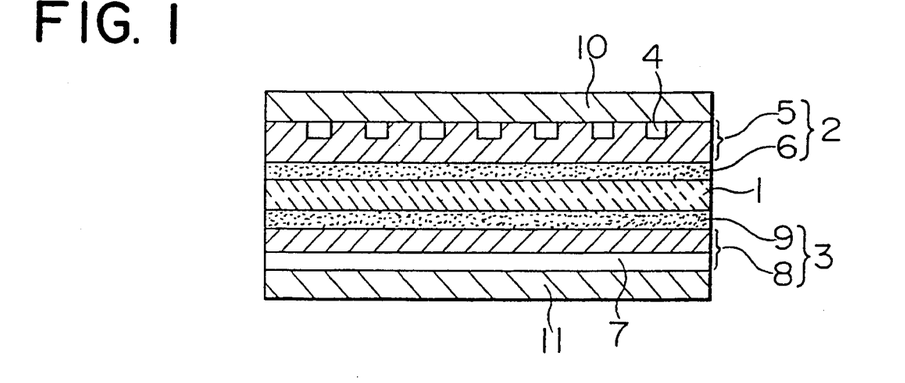
FIG. 1 is a cross section illustrating the essential construction of a phosphoric acid fuel cell as one embodiment of this invention.

FIG. 1 is a cross section illustrating the construction of a phosphoric acid fuel cell as one embodiment of this invention. In this diagram, 1 stands for an electrolyte layer which is a porous electrolyte-retaining member such as, for example, a porous oxide type sintered substance retaining phosphoric acid ($H_3PO_4$) as an acidic electrolyte. This electrolyte layer 1 is held by a pair of gas-diffusion electrodes, i.e. a cathode 2 and an anode 3.

The cathode 2 is composed of a gas feed layer 5 provided with gas conduits 4 and a catalyst layer 6. The anode 3 is similarly composed of a gas feed layer 8 provided with gas conduits 7 and a catalyst layer 9. The catalyst layer 6 of the cathode 2 and the catalyst layer 9 of the anode 3 are opposed to each other across the electrolyte layer 1. The gas conduits 4 of the cathode 2 and the gas conduits 7 of the anode 3 are disposed in such a manner that they will intersect perpendicularly each other.

The catalyst layer 6 is fundamentally formed of a porous carrier consisting of carbon particles or titanium carbide particles and carrying noble metal catalysts thereon. To be more specific, it is formed of a porous mass in which the carrier particles carrying the noble metal catalysts thereon are kept in place with a hydrophobic resin binding agent such as polytetrafluoroethylene.

The catalyst layer 6 is formed of either (a) an oxygen-reducing catalyst having heat-resistant acid-resistant carrier particles on which noble metal catalysts are carried like separately distributed islands in an ocean, the surface of the carrier particles and the noble metal catalysts being coated with a heat-resistant acid-resistant proton-conductive thin film capable of dissolving and diffusing oxygen or (b) an oxygen-reducing catalyst having heat-resistant acid-resistant carrier particles on which noble metal catalysts are carried like separately distributed islands in an ocean, at least the surface of the noble metal catalysts being coated with a polymer thin film having a heat-resistant acid-resistant proton-conductive substance capable of dissolving and diffusing oxygen which is retained in place with a heat-resistant acid-resistant polymer network.

Here, the noble metal catalysts which are carried on the carrier particles can use such Platinum Group metals as Pt and Pd and such platinum alloys as Pt—Pd alloy, Pt—Cr alloy, Pt—Cr—Co alloy, Pt—V alloy, Pt—Mn alloy, and Pt—Mo alloy as well.

Figure 2:
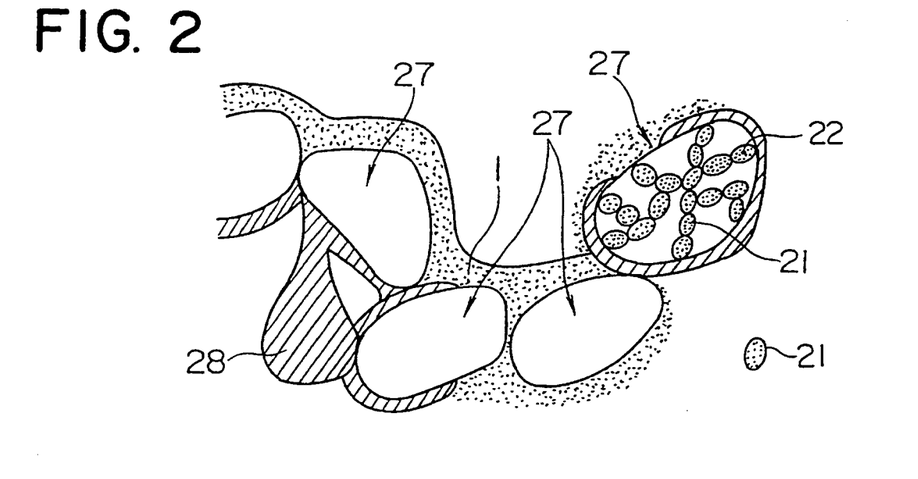
FIG. 2 is a diagram of artist s concept for aiding in the illustration of the essential part of the construction (a catalyst, an electrode substrate serving as a carrier for the catalyst, and an electrolyte) of a cathode to be used in this invention.

The microstructure of the carrier which supports the oxygen-reducing catalyst will be briefly described below. Such carrier particles 21 of heat-resistant and acid-resistant electroconductive carbon or titanium carbide are clustered like branches of a tree as illustrated in FIG. 2 to form catalyst aggregates 27. On the surface of these carrier particles 21, the noble metal catalysts 22 are distributed like islands in an ocean. These catalyst aggregates 27 are bound with such a binding resin 28 as polytetrafluoroethylene to form a cohesive mass. Then, this cohesive mass is deposited on carbon paper, for example, pressed, dried, and sintered to produce a porous electrode.

Figure 3:
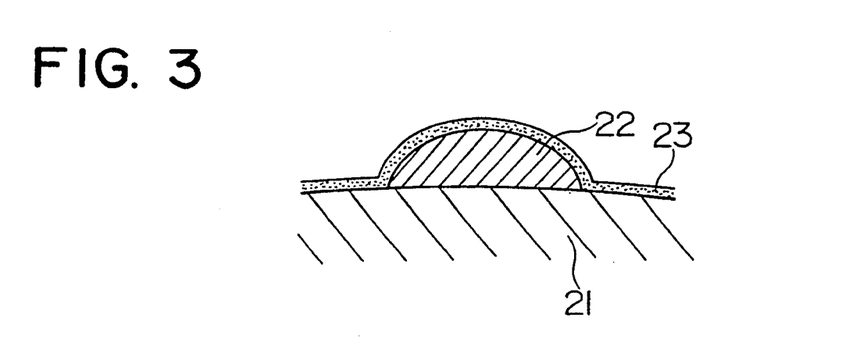
FIG. 3 is a cross section illustrating one example of the essential construction of an oxygen-reducing catalyst to be used in this invention.

In the oxygen-reducing catalyst of (a) mentioned above, the surface of the noble metal catalysts 22 and carrier particles 21 are covered with a heat-resistant and phosphoric acid-resistant proton-conductive thin film 23 as illustrated in FIG. 3.

The proton-conductive thin film 23 mentioned above excels in the ability to dissolve and diffuse molecular or ionic oxygen. It can be made of a material which is capable of resisting heat and phosphoric acid. The choice between an organic material and an inorganic material is irrelevant. Among the materials which are effectively usable, ion-exchange resins having organic fluorine-containing molecules as backbones thereof such as, for example, perfluorocarbon sulfonate resins, are ideally used. The thickness of the proton-conductive thin film 23 is desired to be not more than 1 $\mu$m. If this film has an excessively large thickness, it has the possibility of obstructing the reaction. The coating of the surface of the noble metal catalysts 22 and carrier particles 21 therefor is generally effected conveniently by a procedure which comprises preparing a solution of the ion-exchange resin mentioned above and superposing a layer of this solution on the surface. For the purpose of producing this film uniformly in such an extremely small thickness as not more than 1 $\mu$m, the electrolytic coating method using the ion-exchange resin in the form of a solution is ideally used.

Figure 4:
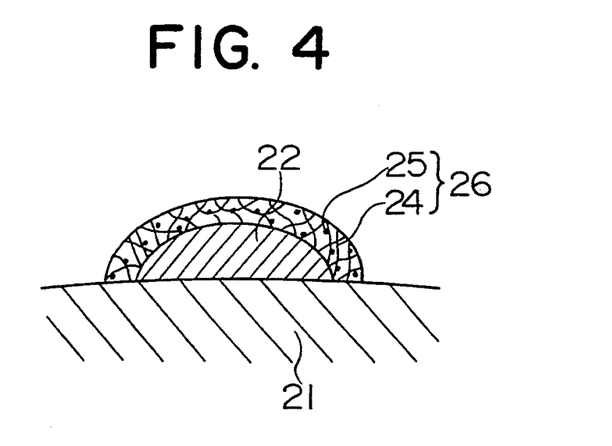
FIG. 4 is a cross section illustrating another example of the essential construction of the oxygen-reducing catalyst to be used in this invention.

In the oxygen-reducing catalyst of (b) mentioned above, at least the surface of the noble metal catalysts 22 distributed on the surface of the carrier particles 21 like separate islands in an ocean is coated with a thin film 26 retaining a proton-conductive substance 25 capable of dissolving and diffusing oxygen kept in place in a polymer network 24 exhibiting the ability to dissolve and diffuse oxygen.

For the polymer network 24, a macromolecular material which exhibits excellent resistance to heat and acids and yields an outstanding binding force to the carrier particles 21 and the noble metal catalyst 22 is selected. With due consideration to the binding force to be exhibited to the carrier particles 21 and the noble metal catalysts 22, polyaniline, polypyrrole, and polyphenylene sulfide which are obtainable by electrolytic polymerization prove to be ideal materials.

For the proton-conductive substance 25 which is to be kept in place in the polymer network 24, various heat-resistant and phosphoric acid-resistant materials which excel in the ability to dissolve and diffuse molecular or ionic oxygen can be used. For example, monomers and polymers which exhibit the ability to conduct protons can be used. The proton-conductive monomers which excel in the ability to dissolve and diffuse oxygen include derivatives of such fluorinated sulfonic acids as trifluoro-methanesulfonic acid and tetrafluoro-ethanedisulfonic acid, derivatives of such fluorinated diphosphoric acid as $(HO)_2OP(CF_2)PO(OH)_2$ and $(HO)_2OP(CF_2)_2PO(OH)_2$, and derivatives of such fluorinated sulfonylic acids as $(CF_3SO_2CH_2SO_2CF_2CF_2)_2$ and $CF_3SO_2NHSO_2C_4F_9$, for example. The proton-conductive polymers which have the same nature as described above include ion-exchange resins having organic fluorine-containing molecules as backbones thereof such as, for example, perfluorocarbon sulfonic acid resin. These ion-exchange resins are obtained by preparing solutions of Nafion 117 (proprietary product of DuPont) and DOW Film (proprietary product of Dow Chemical) and causing the polymer molecules contained in the solutions to be retained in a polymer network.

For the formation of the thin film 26 which has the proton-conductive substance 25 retained in place with the polymer network 24, the method resorting to electrolytic polymerization is employed desirably.

Specifically, this formation is attained by a procedure which comprises preparing a porous electrode substrate with the carrier particles supporting the noble metal catalysts, using this electrode substrate as one of the opposed electrodes for electrolytic polymerization, placing this electrode in an electrolytic bath containing a polymer network material and a proton-conductive substance, and passing electric current between the electrode and a counter electrode thereby effecting electrolytic polymerization. As a result, the polymer network takes shape while incorporating therein the proton-conductive substance and, at the same time, lodges itself within the electrode substrate. In consequence of the electrolytic polymerization which takes place as described above, at least the surface of the noble metal catalyst on the carrier particles is coated with the polymer thin film which has the proton-conductive substance retained in place with the polymer network. In this case, the electrolytic polymerization is desired to be carried out by using an electric current in the form of a pulse. By this procedure, the polymer network retaining the proton-conducting substance can be efficiently incorporated into the minute pores of the order of micrometers in the electrode substrate. Optionally, the proton-conductive substance may be included preparatorily in the electrolyte of the fuel cell and, during the subsequent reaction of the cell, enabled to be incorporated into the polymer network. The thickness of the film can be controlled by regulating the amount of electric current to be supplied. It is desired to be substantially equal to that of the proton-conductive thin film 23 in (a) above.

Electroconductive separators 10 and 11 are respectively disposed outside the cathode 2 and the anode 3 as illustrated in FIG. 1. An electromotive part is constructed by superposing a plurality of elementary cells which each consist of the electrolyte layer 1, the cathode 2, the anode 3, and the electroconductive separators 10 and 11. A phosphoric acid fuel cell is constructed by attaching a gas feed manifold (not shown) to the lateral surface of the electromotive part and clamping the manifold with stated pressure in the direction of superposition.

Figure 6:
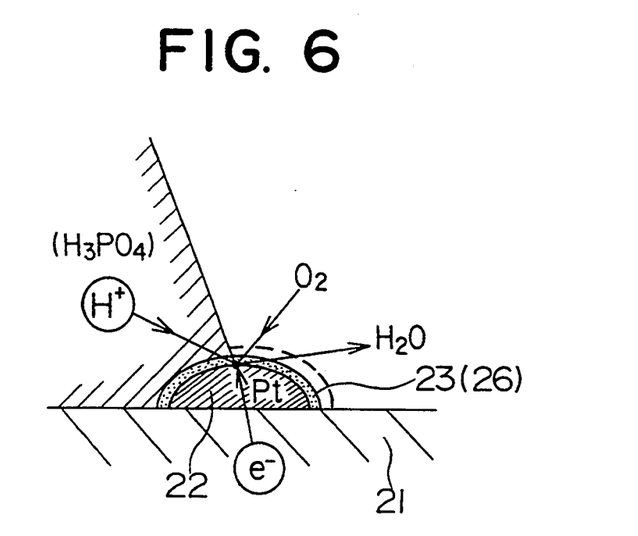
FIG. 6 is a diagram for aiding in the illustration of electrode in the oxygen-reducing catalyst to be used in this invention.
Figure 7:
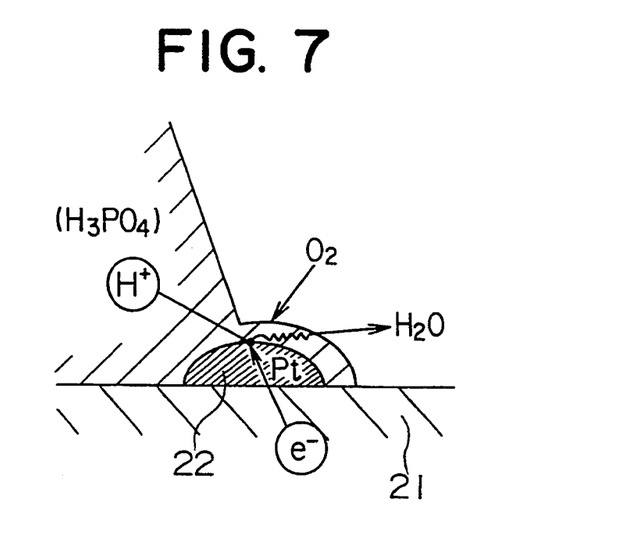
FIG. 7 is a diagram for aiding in the illustration of the electrode reaction in the conventional oxygen-reducing catalyst.

In the phosphoric acid fuel cell which is constructed as described above, as shown in FIG. 6, at least the surface of the noble metal catalysts 22 in the cathode is coated with the proton-conductive thin film 23 exhibiting the ability to dissolve and diffuse oxygen or the thin film 26 having the proton-conductive substance capable of dissolving and diffusing oxygen retained in place with the polymer network exhibiting resistance to heat and acids. Thus, the surface of the noble metal catalysts 22 is prevented from being wetted with a liquid layer ($H_3PO_4$). As a result, the concentration of oxygen molecules or oxygen ions, i.e. one of the reactants present near the surface of the catalyst, is increased and, at the same time, the supply of hydrogen ions, i.e. the other reactant, is not impeded. Further, the discharge of water, i.e. the reaction product, is allowed to proceed smoothly. Owing to these phenomena, the reaction in the cathode is promoted and the activating polarization of the oxygen-reducing reaction at the cathode is decelerated. In contrast, in the conventional cathode, the supply of oxygen molecules or oxygen ions to the neighborhood of the surface of the catalyst is insufficient and the discharge of the produced water is obstructed as illustrated in FIG. 7, the activating polarization tends to occur readily.

Figure 5:
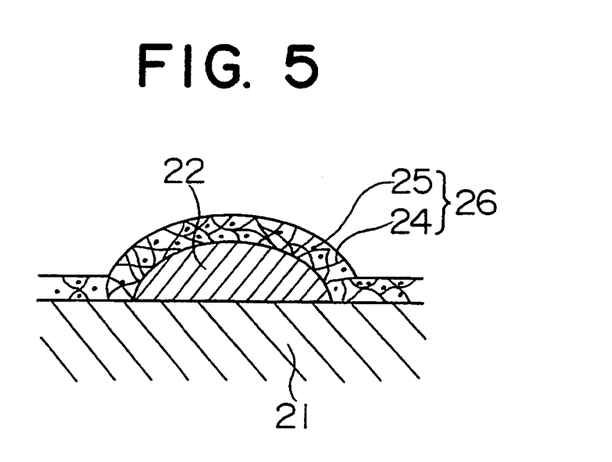
FIG. 5 is a cross section illustrating still another example of the essential construction of the oxygen-reducing catalyst to be used in this invention.

Since not only the noble metal catalyst 22 mentioned above but also the catalyst carrier particles 21 are coated, as illustrated in FIG. 5, by the proton-conductive thin film 23 or the thin film 26 having the proton-conducting substance capable of dissolving and diffusing oxygen retained in place within the macromolecular network exhibiting resistance to heat and acids, the direct contact of the catalyst carrier particles 21 with the liquid phase ($H_3PO_4$) or with oxygen is obstructed and the carrier particles are prevented from corrosion and the fuel cell is enabled to offer a long service life.

Now, concrete examples of the phosphoric acid fuel cell described above and the results of evaluation thereof will be described below.

EXAMPLE 1

A composite material having 7% by weight of a platinum catalyst carried on a heat-treated electroconductive carbon black having a specific surface area of 100 $m^2/g$ (produced by Cabot Corp. and marketed under trademark designation of "Vulcan XC-72R") was prepared as a raw material for an oxygen-reducing catalyst. Separately, a diluted Nafion solution (having a concentration of about 0.01% by weight) was prepared by liquefying perfluorocarbon sulfonic acid resin (produced by DuPont and marketed under trademark designation of "Nafion 117") and dialyzing the resultant Nafion solution (having Nafion 117 dissolved in a concentration of about 5% by weight in a mixed solvent consisting of a lower alcohol and water). A proton-conductive thin film having a thickness of about 1 μm (hereinafter referred to as "modifying catalyst") was formed of the diluted solution.

In a polytetrafluoroethylene-water type suspension (produced by DuPont and marketed under trademark designation of "TFE-30"), the modifying catalyst was dispersed by the use of an ultrasonic wave. Then, aluminum trichloride was added to the mixed suspension to induce precipitation of flocculent flakes. The mass of such flocculent flakes containing the modifying catalyst (50% by weight on dry basis) and polytetrafluoroethylene was deposited on a sheet of carbon paper, pressed, dried, and sintered in an atmosphere of nitrogen at 340° C. for 20 minutes to produce an electrode (cathode). The electrode thus obtained was so prepared as to contain 0.5 mg of platinum per unit surface area (1 $cm^2$) of the electrode.

Figure 8:
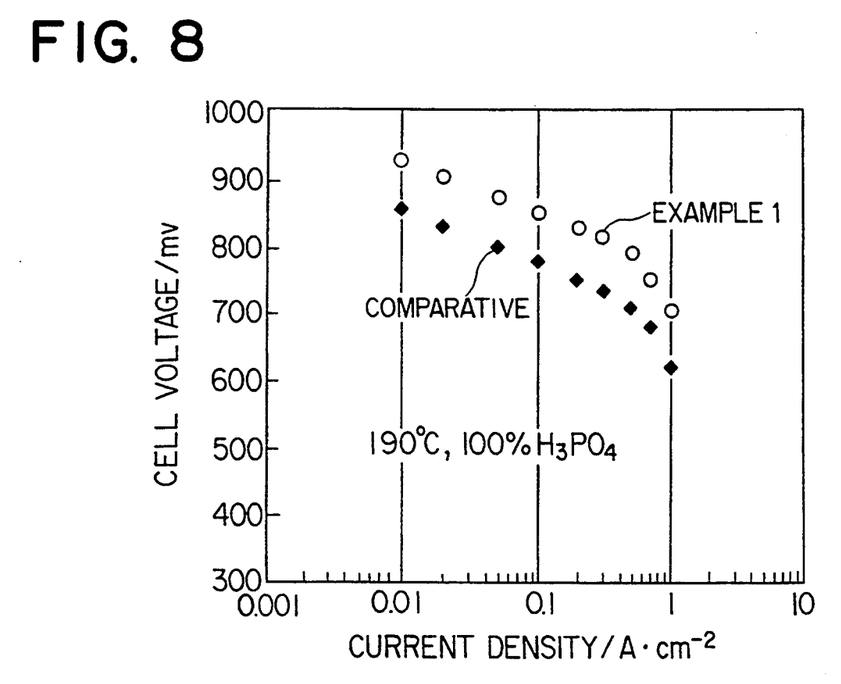
FIG. 8 is a diagram comparing the half-cell characteristics of a cathode for use in a phosphoric acid fuel cell as one embodiment of this invention with those of the conventional countertype.

The cathode thus obtained was tested for half-cell characteristics by using 100% phosphoric acid as an electrolyte and feeding air at a rate of 500 ml/min at 190° C. The results of this test are shown in FIG. 8 together with those obtained in a comparative experiment using a conventional catalyst (formed of carbon black having 7% by weight of a platinum catalyst carried thereon and avoiding use of a proton-conducting thin film). It is clearly noted from FIG. 8 that the cathode of Example 1 excelled that of the comparative experiment in polarization characteristics, promised impartation of enhanced quality to the phosphoric acid fuel cell, and warranted a cut in cost.

EXAMPLE 2

The same raw material for an oxygen-reducing catalyst as used in Example 1 was prepared. This raw material was dispersed in a polytetrafluoroethylene-water type suspension (produced by DuPont and marketed under trademark designation of "TFE-30") by the use of an ultrasonic wave. Then, aluminum trichloride was added to the mixed suspension to induce precipitation of flocculent flakes. The mass of flocculent flakes containing the raw material for catalyst (50% by weight on dry basis) and polytetrafluoroethylene was deposited on a sheet of carbon paper, pressed, dried, and sintered in an atmosphere of nitrogen at 340° C. for 20 minutes, to produce an electrode substrate.

The electrode substrate mentioned above was processed by following the procedure described above to effect electrolytic polymerization and consequently attain formation on the surface of the oxygen-reducing catalyst a thin film having a proton-conductive monomer retained within a polymer network. In this case, polyaniline was used for the polymer network and trifluoromethane sulfonic acid for the proton-conductive monomer. First, the aforementioned electrode substrate was placed as a working electrode together with a counter electrode in an electrolytic cell containing an electrolytic polymerization solution formed of a mixed solution consisting of 1 mol of aniline per liter and 2 mols of trifluoromethanesulfonic acid per liter. With the temperature of the electrolytic polymerization solution kept at 0° C., an electric current was passed between the opposed electrodes at a fixed amperage of 2 mA/cm$^2$ for five minutes and then at a fixed amperage of 20 mA/cm$^2$ for 10 minutes to effect the electrolytic polymerization. As a result, a thin film having trifluoromethanesulfonic acid retained within the polyaniline network was formed on the surface of the catalyst, to produce a cathode.

EXAMPLE 3

By using an electrode substrate prepared in the same manner as in Example 2 and effecting electrolytic polymerization in the same manner as in Example 2, a thin film which had a proton-conductive polymer retained in place of the proton-conductive monomer of Example 2 within a polymer network was formed on the surface of a catalyst. In this case, polyaniline was used for the polymer network and Nafion 117 (proprietary product of DuPont) for the proton-conductive polymer. The conditions for the electrolytic polymerization were identical to those of Example 2, excepting Nafion 117 was used in place of trifluoromethanesulfonic acid. Thus, a thin film having Nafion 117 retained in the polyaniline network was formed on the surface of the catalyst, to produce a cathode.

Figure 9:
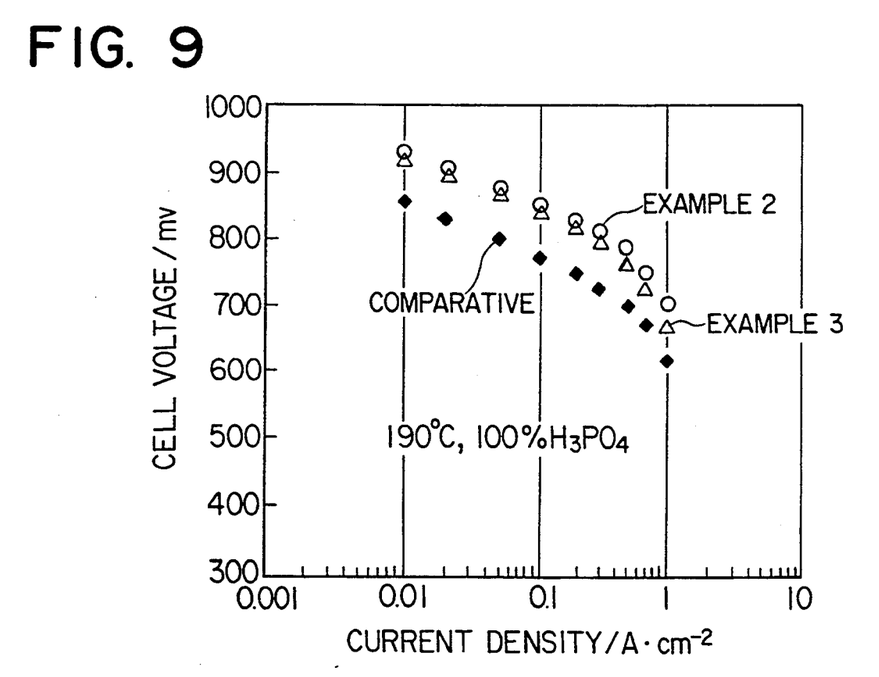
FIG. 9 is a diagram comparing the half-cell characteristics of a cathode for use in a phosphoric acid fuel cell as another embodiment of this invention with those of the conventional countertype.

The electrodes of Example 2 and Example 3 obtained as described above were tested for half-cell characteristics of cathode in the same manner as in Example 1. The results of this test are shown in FIG. 9 together with those obtained in comparative experiments using a conventional catalyst (formed of carbon black having 7% by weight of a platinum catalyst carried thereon and without use of a proton-conductive thin film). It is clearly noted from FIG. 9 that the cathodes of Example 2 and Example 3 excelled those of the comparative experiments in polarization characteristics, promised impartation of enhanced quality to the phosphoric acid fuel cell, and warranted a cut of cost.

EXAMPLE 4

An electrode substrate prepared in the same manner as in Example 2 was processed by the following procedure to effect electrolytic polymerization. A polymer network and a proton-conductive monomer were formed of the same materials as used in Example 2. The electrode substrate mentioned above was placed as a working electrode together with a counter electrode in an electrolytic cell containing an electrolytic polymerization solution formed of a mixed solution consisting of 1 mol of aniline per liter and 2 mols of borofluoric acid per liter and submitted to electrolytic polymerization under the same conditions as those of Example 2. Thus, a polyaniline network film was formed on the surface of the catalyst.

The electrode thus obtained was tested for half-cell characteristics by using as an electrolyte 100% phosphoric acid incorporating therein 1% by volume of trifluoromethanesulfonic acid and feeding air at a rate of 500 ml/min at 190° C. The results of this test are shown in FIG. 10 together with those of a comparative experiment.

EXAMPLE 5

An electrode was prepared in the same manner as in Example 4. This electrode was tested for half-cell characteristics of cathode by using as an electrolyte 100% phosphoric acid incorporating therein 1% by volume of Nafion 117 and feeding air at a rate of 50 ml/min at 190° C. The results are shown in FIG. 10.

Figure 10:
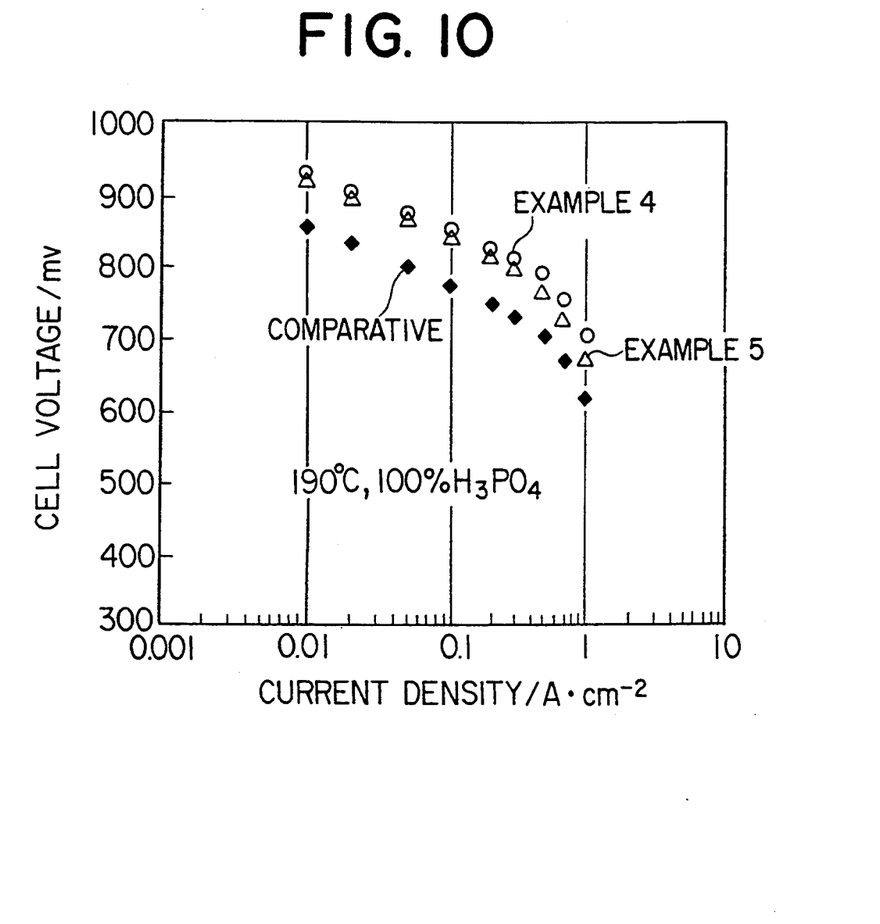
FIG. 10 is a diagram comparing the half-cell characteristics of a cathode for use in a phosphoric acid fuel cell as yet another embodiment of this invention with those of the conventional countertype.

It is clearly noted from FIG. 10 that the cathodes of Examples 4 and 5 excelled those of the respective comparative experiments in polarization characteristics, promised impartation of enhanced quality to the phosphoric acid fuel cell, and warranted a cut of cost.

EXAMPLE 6

An electrode substrate was prepared in the same manner as in Example 2. This electrode substrate was submitted to electrolytic polymerization by the following procedure to form on the surface of a catalyst a thin film having a proton-conductive monomer retained within a polymer network. In this example, the electrolytic polymerization was carried out by applying an electric current in the form of a rectangular pulse. In this case, polyaniline was used for the polymer network and trifluoromethanesulfonic acid for the proton-conductive monomer. The electrode substrate mentioned above was placed as a working electrode together with a counter electrode in an electrolytic cell containing an electrolytic polymerization solution formed of a mixed solution consisting of 1 mol of aniline per liter and 2 mols of trifluoromethanesulfonic acid per liter. With the temperature of the electrolytic polymerization solution kept at 0° C., the rectangular pulse current was passed at a rate of 5 m coulombs/cm$^2$ to effect pulse electrolytic polymerization. The conditions for the reaction were 5 mA/cm$^2$ in current density, 5 msec in pulse-on time, and 20 msec in pulse-off time (duty cycle: 0.2). Thus, a thin film having trifluoromethanesulfonic acid retained within a polyaniline network was formed on the surface of the catalyst, to produce a cathode.

EXAMPLE 7

By using an electrode substrate prepared in the same manner as in Example 6 and effecting electrolytic polymerization in the same manner as in Example 6, a thin film having a proton-conductive polymer retained in place of the proton-conductive monomer within a polymer network was formed on the surface of a catalyst. Polyaniline was used for the polymer network and Nafion 117 (proprietary product of DuPont) for the proton-conductive polymer. The conditions for the electrolytic polymerization were identical to those of Example 6, excepting Nafion 117 was used in place of trifluoromethanesulfonic acid. Thus, a thin film having Nafion 117 retained within a polyaniline network was formed on the surface of the catalyst, to obtain a cathode.

The electrodes of Example 6 and Example 7 were tested for half-cell characteristics of cathode in the same manner as in Example 1. The results of this test were substantially equal to those of the electrodes of Examples 2 and 3 shown in FIG. 9. The cathodes of Examples 6 and 7, similarly to those of Examples 2 and 3, excelled those of respective comparative experiments in polarization characteristics, promised impartation of enhanced quality to the phosphoric acid fuel cell, and warranted a cut in cost.

EXAMPLE 8

An electrode substrate was prepared in the same manner as in Example 6. This electrode substrate was processed by the following procedure to effect electrolytic polymerization. The polymer network and the proton-conductive monomer used herein were formed of the same materials as used in Example 6. The electrode substrate mentioned above was placed as a working electrode together with a counter electrode in an electrolytic cell containing an electrolytic polymerization solution formed of a mixed solution consisting of 1 mol of aniline per liter and 2 mols of borofluoric acid per liter and submitted to electrolytic polymerization under the same conditions as those used in Example 6. Thus, a polyaniline network film was formed on the surface of the catalyst.

The electrode (cathode) obtained as described above was tested for half-cell characteristics of cathode by using as an electrolyte 100% phosphoric acid incorporating therein 1% by volume of trifluoromethanesulfonic acid and feeding air at a rate of 500 ml/min at 190° C. The results of this test were equal to those of Example 4 shown in FIG. 10.

EXAMPLE 9

An electrode was prepared in the same manner as in Example 8. This electrode was tested for half-cell characteristics of cathode by using as an electrolyte 100% phosphoric acid incorporating therein 1% by volume of Nafion 117 and feeding air at a rate of 500 ml/min at 190° C. The results of this test were equal to those obtained in Example 5 shown in FIG. 10.

It is clearly noted from the results of tests that the cathodes of Examples 8 and 9, similarly to those of Examples 4 and 5, excelled those of the respective comparative experiments in polarization characteristics, promised impartation of enhanced quality to the phosphoric acid fuel cell, and warranted a cut of cost.

Now, an embodiment of this invention in a polymer electrolyte fuel cell will be described below.

Figure 11:
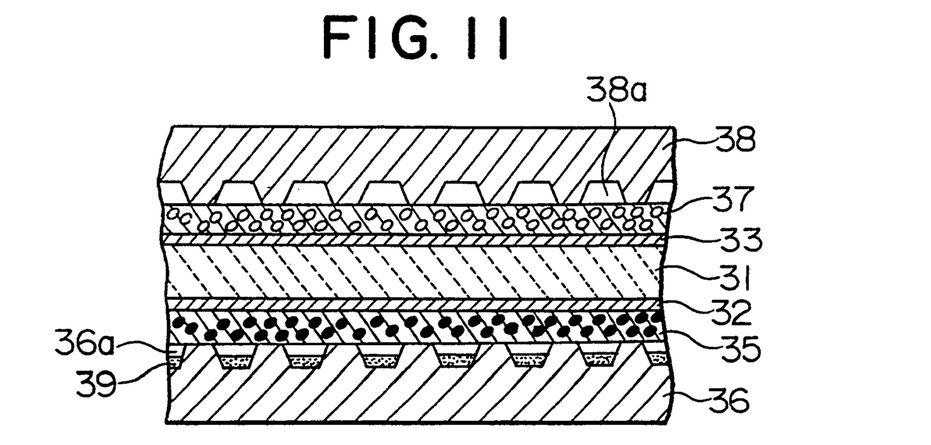
FIG. 11 is a cross section illustrating the essential construction of a polymer electrolyte fuel cell as one embodiment of this invention.

FIG. 11 is a cross section illustrating the essential part of a polymer electrolyte fuel cell as one embodiment of this invention. In this diagram, 31 stands for an electrolyte film formed of a solid polymer film of perfluorocarbon sulfonic acid resin exhibiting proton conduction. On the opposite surfaces of this electrolyte film 31, a cathode 32 and an anode 33 are integrally superposed. These cathode 32 and anode 33 are porous gas-diffusion electrodes and they each combine the functions of both porous catalyst layer and gas-diffusion layer. The cathode 32, similarly to that in the phosphoric acid fuel cell of the preceding examples, is formed of an oxygen-reducing catalyst of the construction of (a) or (b) mentioned above.

On the other surface of the cathode 32, a collector plate 36 made of such an electroconductive substance as carbon and provided with grooves 36a destined to constitute themselves conduits for oxygen gas is disposed through the medium of a porous electroconductive water-repelling layer 35. On the other surface of the anode 33, a collector plate 38 made of such an electroconductive substance as carbon and provided with grooves 38a destined to constitute themselves conduits for hydrogen gas was disposed through the medium of a porous carbon supporting member 37. When oxygen gas is supplied to the cathode 32, the reaction product such as, for example, water is produced on the cathode 32 side. Wicks 39 intended to serve as paths for the travel of the electrolyte and a liquid reaction product are formed inside the grooves 36a formed in the collector plate 36 on the cathode 32 side.

The polymer electrolyte fuel cell constructed as described above, similarly to the phosphoric acid fuel cell described above, exhibits improved polarization characteristics of cathode, promises impartation of enhanced quality to the polymer electrolyte fuel cell, and warrants a cut in cost.

The embodiment cited above has been described as relying on electrolytic polymerization for the formation on the surface of an electrode substrate of a thin film having a proton-conductive substance retained within a polymer network. This method can be utilized in various applications other than for the production of an electrode for a fuel cell. To be specific, by preparing a substrate or sample desired to form a thin film in place of an electrode substrate and using a substance desired to be incorporated in a polymer network in the place of a proton-conductive substance, a thin film having the desired substance incorporated in the polymer network can be formed on the desired sample. Particularly when the sample has a porous texture, the electrolytic polymerization using a pulse of electric current is used advantageously for this purpose. Thus, this invention has an immense economic merit.

Since the fuel cell of this invention curbs the activating polarization of a cathode as described above, it can generously improve the quality of the cathode and impart enhanced quality to the phosphoric acid fuel cell. This fact permits a reduction in the cost of the fuel cell and contributes in a large measure to commercialization of a power generating plant using acidic electrolyte type fuel cells.

What is claimed is:

1. A fuel cell comprising a pair of gas diffusion electrodes having an anode and a cathode, and an acidic electrolyte layer between said pair of gas-diffusion electrodes, said cathode comprising:
   electroconductive carrier particles; and
   noble metal catalysts disposed on surfaces of said electroconductive carrier particles,
   wherein the surfaces of said electroconductive carrier particles and the surfaces of said noble metal catalysts are covered with a proton-conductive thin film which is capable of dissolving and diffusing oxygen and offering resistance to heat and acids.

2. The fuel cell according to claim 1, wherein said proton-conductive thin film is formed of an ion-exchange resin having a fluorine-containing polymer.

3. The fuel cell according to claim 2, wherein said ion-exchange resin having said fluorine-containing polymer is a perfluorocarbonsulfonic acid resin.

4. The fuel cell according to claim 1, wherein said proton-conductive thin film has a thickness of not more than 1 $\mu$m.

5. A fuel cell comprising a pair of gas diffusion electrodes having an anode and a cathode, and an acidic electrolyte layer between said pair of gas-diffusion electrodes, said cathode comprising:
   electroconductive carrier particles; and
   noble metal catalysts disposed on surfaces of said electroconductive carrier particles,
   wherein at least the surfaces of said noble metal catalysts are covered with a thin film which is formed of a heat-resistant and acid resistant polymer network containing a proton-conductive substance capable of dissolving and diffusing oxygen therein.

6. The fuel cell according to claim 5, wherein said proton-conductive substance is at least one member selected from the group consisting of derivatives of fluorinated sulfonic acid, derivatives of fluorinated diphosphoric acid and derivatives of fluorinated sulfonylic acid.

7. The fuel cell according to claim 5, wherein said proton-conductive substance is an ion-exchange resin having a fluorine-containing polymer.

8. The fuel cell according to claim 5, wherein said polymer network is formed of at least one member selected from the group consisting of polyaniline, polypyrrole and polyphenylene sulfide.

9. The fuel cell according to claim 5, wherein said thin-film is an electrolytic polymerization film.

* * * * *